(12) United States Patent
Manipatruni et al.

(10) Patent No.: US 9,355,242 B2
(45) Date of Patent: May 31, 2016

(54) METHOD AND APPARATUS FOR MANAGING AND ACCESSING PERSONAL DATA

(71) Applicants: Sasikanth Manipatruni, Hillsboro, OR (US); Kelin J. Kuhn, Aloha, OR (US); Debendra Mallik, Chandler, AZ (US); John C. Johnson, Phoenix, AZ (US)

(72) Inventors: Sasikanth Manipatruni, Hillsboro, OR (US); Kelin J. Kuhn, Aloha, OR (US); Debendra Mallik, Chandler, AZ (US); John C. Johnson, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 282 days.

(21) Appl. No.: 13/717,433

(22) Filed: Dec. 17, 2012

(65) Prior Publication Data

US 2014/0173716 A1 Jun. 19, 2014

(51) Int. Cl.
 *G06F 21/44* (2013.01)
 *G06F 21/10* (2013.01)
 *G06F 21/35* (2013.01)

(52) U.S. Cl.
 CPC .............. *G06F 21/44* (2013.01); *G06F 21/10* (2013.01); *G06F 21/35* (2013.01)

(58) Field of Classification Search
 CPC ...... H05W 12/06; H05W 12/00; G06F 21/10; G06F 21/6245; G06F 19/3406; G06F 19/3412; G06F 19/30; G06F 19/3487
 See application file for complete search history.

(56) References Cited

U.S. PATENT DOCUMENTS

| | | | |
|---|---|---|---|
| 6,420,452 B1 * | 7/2002 | Gunatillake et al. .......... | 523/105 |
| 7,676,272 B2 * | 3/2010 | Lang .................... | A61N 1/3708 128/905 |
| 8,688,981 B2 * | 4/2014 | Gim .................... | G06F 19/3418 713/168 |
| 2005/0102113 A1 * | 5/2005 | Miracle ................ | G01D 5/2013 702/64 |
| 2010/0165593 A1 * | 7/2010 | Townsend et al. ........... | 361/807 |
| 2010/0223020 A1 * | 9/2010 | Goetz ............... | 702/104 |
| 2011/0001610 A1 * | 1/2011 | Stevenson ............ | A61B 5/0031 340/10.1 |
| 2011/0018117 A1 * | 1/2011 | Yang et al. ................. | 257/690 |
| 2011/0084132 A1 * | 4/2011 | Tofighbakhsh ....... | G06F 19/323 235/380 |
| 2011/0210926 A1 * | 9/2011 | Pasquero ................ | G06F 3/016 345/173 |
| 2012/0052794 A1 * | 3/2012 | Mazar ...................... | H04K 3/41 455/1 |
| 2013/0009892 A1 * | 1/2013 | Salmela .................. | G06F 3/016 345/173 |
| 2013/0047268 A1 * | 2/2013 | Arat ..................... | G06F 21/6218 726/28 |
| 2013/0065648 A1 * | 3/2013 | Kim .................. | G06F 21/31 455/566 |
| 2013/0078912 A1 * | 3/2013 | San Vicente et al. .......... | 455/39 |
| 2013/0268767 A1 * | 10/2013 | Schrecker ............... | G06F 21/31 713/185 |

OTHER PUBLICATIONS

Linear Solenoid, Mar. 21, 2008.*

\* cited by examiner

*Primary Examiner* — Fatoumata Traore
*Assistant Examiner* — Kendall Dolly
(74) *Attorney, Agent, or Firm* — Blakely, Sokoloff, Taylor & Zafman LLP

(57) ABSTRACT

Managing and accessing personal data is described. In one example, an apparatus has an application processor, a memory to store data, a receive and a transmit array coupled to the application processor to receive data to store in the memory and to transmit data stored in the memory through a wireless interface, and an inertial sensor to receive user commands to authorize the processor to receive and transmit data through the receive and transmit array.

18 Claims, 7 Drawing Sheets

METHOD AND APPARATUS FOR MANAGING AND ACCESSING PERSONAL DATA

FIELD

The present description relates to the field of personal data management and, in particular, to a device that may be embedded or carried for short range communication.

BACKGROUND

People are asked to carry an increasingly large amount of personal data with them in the form of authentication, passwords, and personal knowledge. Typically these have been carried as paper documents and plastic cards, such as a driver's license or bank cards. Various forms of identification may also allow access to more information stored on central medical or other types of document servers. However, the additional information requires access to the server and the records are at risk of corruption, loss, or theft.

For authentication, people may remember passwords, use hard locks, or present biometrics such as a finger print to a reader for recognition. In some cases, voice recognition, has been used in addition to or instead of keyboard, mouse, and external dongle combinations. With more smart devices being introduced into daily life and more servers requiring unique authentication, the number of different authentication codes and formats increases. The use of the same weak passwords for multiple purposes also increases the risk of identity attacks and data theft.

BRIEF DESCRIPTION OF THE DRAWING FIGURES

Embodiments of the invention are illustrated by way of example, and not by way of limitation, in the figures of the accompanying drawings in which like reference numerals refer to similar elements.

DETAILED DESCRIPTION

A device is presented herein that provides people a secure and private way to carry critical information such as bio data, medical records, and financial data. It may also be used to authenticate a person, to enable a natural interaction method with computing elements, and to provide seamless customization so that each computer, electronic device, or even automobile responds to the specific requirements or desires of the individual.

A personal embedded unit consisting of minimal storage, communication, encryption and a sensor suite may be embedded or carried securely in or on or to a person to carry personal information. This unit will be referred to as an embedded computing unit (ECU) herein, however, it is not necessary for the unit to be embedded into a person or animal. It may instead be embedded into jewelry, a wrist band, or an article of clothing. The ECU may be used for receiving, encrypting, storing and retrieving and transmitting data. It may be constructed in a single system-on-chip configuration in a modern semiconductor facility.

Figure 1:
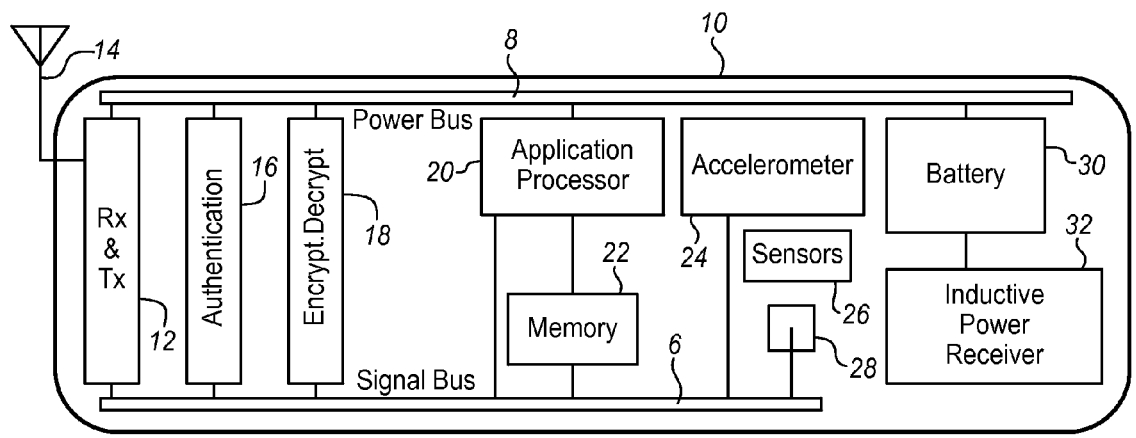
FIG. 1 is a block diagram of a computing unit according to an embodiment of the invention.

FIG. 1 is a block diagram of an example of an ECU 10 according to an embodiment of the invention. Receive and transmit arrays 12 are coupled to receive and transmit radiative elements, such as antennas 14 that may be embedded into the device in its packaging, casing, or another component. The antennas may also be coupled to external antennas. The receive and transmit arrays are coupled to an internal power bus 8 for power and in internal signal bus 6 to communicate data with other components of the ECU.

The transmit and receive arrays can operate in close proximity with other ECUs or other devices through, for example, code division multiplexed low frequency signals or time division multiplexed low frequency signals. Read and write access with the ECU may be limited to high encryption wireless channels. The electromagnetic signals may span any allowable spectrum allocated for consumer and medical electronics by a spectrum licensing body, such as the Federal Communications Commission including radio wave, microwave and optical communications.

The antennas or radiative elements are used for data transmission and reception and may also be used for RFID (Radio Frequency Identification) and wireless electricity. There may be multiple antennas for different purposes or the antenna may be shared. In one example, the antennas are designed for receiving and transmitting large amounts of information with a limited spatial range as required for data storage. There may be separate antennas for receiving and transmitting small amounts of data, such as through RFID or NFC.

In one implementation, the radiative elements are embedded into a bio-polymer outer casing of the ECU and made of a metal that is safe for living tissue implantation such as titanium. In another implementation, the radiative elements may be created in a backside of a multi-chip module containing the ECU or in the back end process of producing the ECU as a system-on-a-chip (SOC).

The ECU also includes authentication units 16 coupled to the power 8 and signal 6 busses which may include, for example, hard coded password control or software controlled access codes. Encryption and decryption units also coupled to the internal power and signal busses allow data stored in the ECU to be protected from outside access. Received data may be decrypted for storage and decrypted for external transmission. In addition, the encryption unit may be used to encrypt data before it is transmitted using an internal key or a key received from an outside source or requester.

Sensors 26 may be included in the ECU for a variety of different purposes. The sensors may include position, navigation, accelerometers, compasses, gyroscopes, pressure, and motion control. The particular sensors may be determined based on the intended uses of the ECU. In the illustrated example, an accelerometer 24 is coupled to the signal bus 6 together with other sensors 26. Further sensors 26 may include temperature, blood pressure, blood sugar, pulse rate, arrhythmia, ECG (Electrocardiogram), hormone, and cholesterol sensors, among others. Acoustic sensors may also be used to receive voice communication from a user.

In addition to sensors, actuators may be used to communicate with the person. For example a mechanical pulse may be provided with a solenoid or by driving elements of an accelerometer. An acoustic signal may be generated using a piezoelectric or other acoustic actuator or electrical feedback may be provided to the user or wearer.

The ECU may also have an additional radio frequency identification (RFID), or near field communication (NFC) sensor 28 to allow very low or no power communication with the ECU. A passive RFID tag may be used to allow an external scanner to identify the ECU and determine an address or name with which to address the receive array 12. The RFID unit may instead or in addition provide a public key for use in encrypting data that is sent and received between the ECU and an external unit. An active RFID tag may be used in a manner similar to an NFC or low power Bluetooth device to provide very low power data communications with an external device.

The ECU power bus is coupled to a battery 30 within the ECU to power all of the devices of the ECU. The battery may be a biocompatible power source such as beta voltaic power cell or a lithium-iodide electrochemical cell. The battery may be provided with sufficient power for long term operation or it may be provided with a charger. Any of a variety of wireless electrical power transfer techniques may be used to charge the battery. The battery may be powered using inductive power transfer tuned to a resonant element embedded into the ECU. In this example, the ECU may be held near a charging mat or wand to induce power into an inductive power receiver 32 which in turns applies a voltage to the battery 30 for charging. The battery and a wireless charging technology together allow the ECU to remotely charge, retain and provide extended self-sustaining operation.

To coordinate and drive all operations within the ECU, an application processor 20 is coupled to the power 8 and signal bus 6 in order to communicate with and control each of the devices. This control may include driving sleep, hibernation, and off modes for power consumption. The processor is coupled to one or more memories 22 to retrieve instructions and data including stored personal data and authentication information.

The memory may be a single array or it may be multi-staged including some long retention time memory together with some short retention time memory. Spintronic memory using magnetic tunnel junction elements or a combination of NAND, or NOR flash memories may be used, among others. Some or all of the memory may be physically secured by encryption. The memory may include its own encryption mechanism to provide added security for all or some of the data. A trusted platform module (TPM) or similar mechanism may be used to secure the memory.

Non volatile solid state memory has recently become dense and inexpensive. As a result a great amount of information may be stored. Instead of storing just passwords and addresses, the memory may be used to store data that conventionally would be accessed from a remote site. The memory may be used to store a wide range of one or more different types of user information including medical database, biometrics, blood group, and present medications. Essential medical routines of a person may be stored. The memory may also or alternatively store financial data such as credit, debit, and account information as well as authentication to access such data.

In addition or instead, the memory may be used to store personal preferences for smart home automated devices, computer password and login data, settings for a computer or other electronic device and other data. The computing preferences of the user may also be stored including commonly used programs, calendar events, access to different servers for cloud storage. The ECU may then be used to load this information to any computer, terminal, or mobile device upon a request from the user. The ECU may also communicate with an automobile to communicate the driving preferences of the user including the positions of the mirrors, seat position, heating and ventilation settings and destinations and other location of the user. By configuring the ECU to interact with many different devices and carry specific personal information for each the customization becomes seamless in use. Each machine or device, whether a computer, electronic device, appliance, or automobile, responds to the specifically stored requirements of the individual.

The ECU 10 may be formed of multiple components in one or more packages or a single SOC that combines most or all of the components. Some of the components may not be used or not included for some applications while other applications may include additional elements not shown.

The entire ECU may be contained within external packaging. Alternatively, the ECU may be constructed as a multi-chip module integrated on to a flexible bio-compatible substrate. The ECU may be hermetically encased in a long term implantable bio-polymer such as polycarbonate-based thermoplastic polyurethanes and bio-compatible metals such as titanium. Examples of the polyurethanes may include multiple polymers such as methylene di-p-phenyl-diisocyanate (MDI), hexamethylene diisocyanate (HDI), polycaprolactone diol (PCL-diol) and N,N-bis(2-hydroxyethyl)-2-amino-ethane-sulfonic acid, etc. Other plastics or bio-polymers may be used in addition to or instead of those described.

The ECU can be attached to the body via jewelry, body art, wrist bands, collars and other personal accessories. It can also be attached to or incorporated into existing implanted medical devices such as pacemakers and IUDs. Absent another device, the ECU can be implanted separately into a human or animal body in a secure location. The location may be chosen to meet the preferences or needs of any particular individual or to avoid theft of the ECU.

Communication with the ECU can be in a variety of different ways depending on the particular interaction and who the communicating entities are. The ECU can provide direct two-way communication with the user. The user can send commands to the ECU through its sensors such as the accelerometers using different sequences of body movements. A particular wave of the hand or a writing gesture may be used to send signals to an ECU on or in an arm. The ECU may be position and programmed to recognize an actual hand-written signature through the accelerometers. Other body motions, such as a particular sequence of walking styles, bending, or leg movements may be used for an ECU located elsewhere. So for example, the ECU can be enabled or disabled at short notice through a series of pre-programmed mechanical gestures communicated to the device through its onboard accelerometers. Alternatively, or in addition, the ECU may include a pressure transducer or a microphone to allow the ECU to respond to sound made by the user. The user might tap an instruction on the device or use vocal or other sounds to command the ECU.

The ECU can send a reply to the user through, for example, a short series of programmed mechanical pulses generated using the on board accelerometer. This may be felt through an implanted or worn ECU. The ECU may also provide optical or acoustic feedback to the user.

A user or operator may also communicate with the ECU using a second device through one or more of the wireless interfaces onboard the ECU. Communication and programming may be done, for example, using a secure programming device in a physically secured location. The write access for the ECU's critical data may be protected using a high encryption wireless channel. A second NFC device, including a properly programmed smart phone, may also be used to initiate a communication session. Data may then be communicated through the transmit and receive unit, through the NFC system or in other ways. An ECU may also communicate with other ECUs. A plurality of ECUs can operate when in proximity to each other using for example, code division multiplexed low frequency signals or time division multiplexed low frequency signals.

Figure 2:
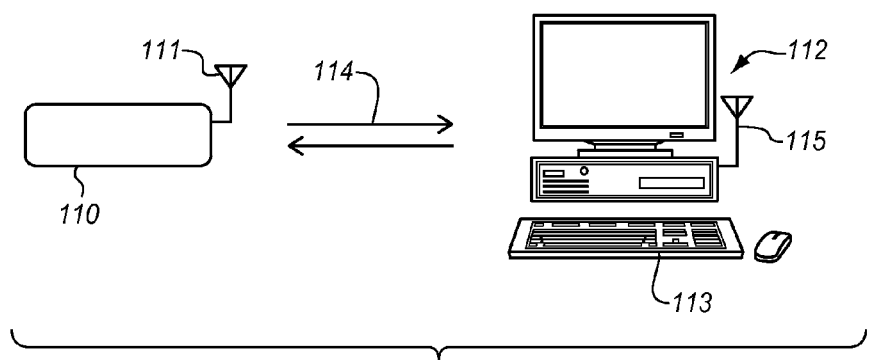
FIG. 2 is a diagram of communication between the computing unit and a fixed computer terminal according to an embodiment of the invention.

FIG. 2 is a diagram of a computer terminal use example for the ECU described above. In the example of FIG. 2 the ECU 110 has an antenna 111 with which it can communicate 114 with a computer 112. The computer has an antenna 115 to send signals to and from the ECU. The computer also has a computer input device such as a keyboard and mouse 113. In this configuration the ECU can provide authentication for the user. It can also send data back and forth between the computer and the ECU. This can allow the data in the ECU to be updated. It can also allow the ECU and its operation to be configured for any of the different use scenarios described herein. The ECU can also be used to send authentication such as passwords for entry into the computer as well as access to different web sites, servers, and other secure locations.

The ECU can also be used to store personal settings and personal files for the user. So, for example, the user can first authenticate himself to the computer 112 and then configure the computer according to his own user preferences. These preferences can then be sent to the ECU through the radio interface 114 using the antennas 111 and 115. When the user returns to the computer 112, this configuration, personalization and settings information can then be transferred from the ECU back into the computer so that the user can resume at the same location and with the same settings and configuration as during the last session. The configuration settings can be updated each time the user accesses the computer so that with each subsequent access the computer is configured appropriately. This model can be extended to other compatible computers so that whenever the user authenticates with an approved computer, the same configuration, settings and even files can appear just as they were on the previous computer. While a desktop computer is shown in the example of FIG. 2, any of a variety of other personal computing devices or business computing devices may be used. A similar configuration may also be used for individual employees to access terminals into an intranet, or internet, main frame, or server enterprise computer configuration.

Figure 3:
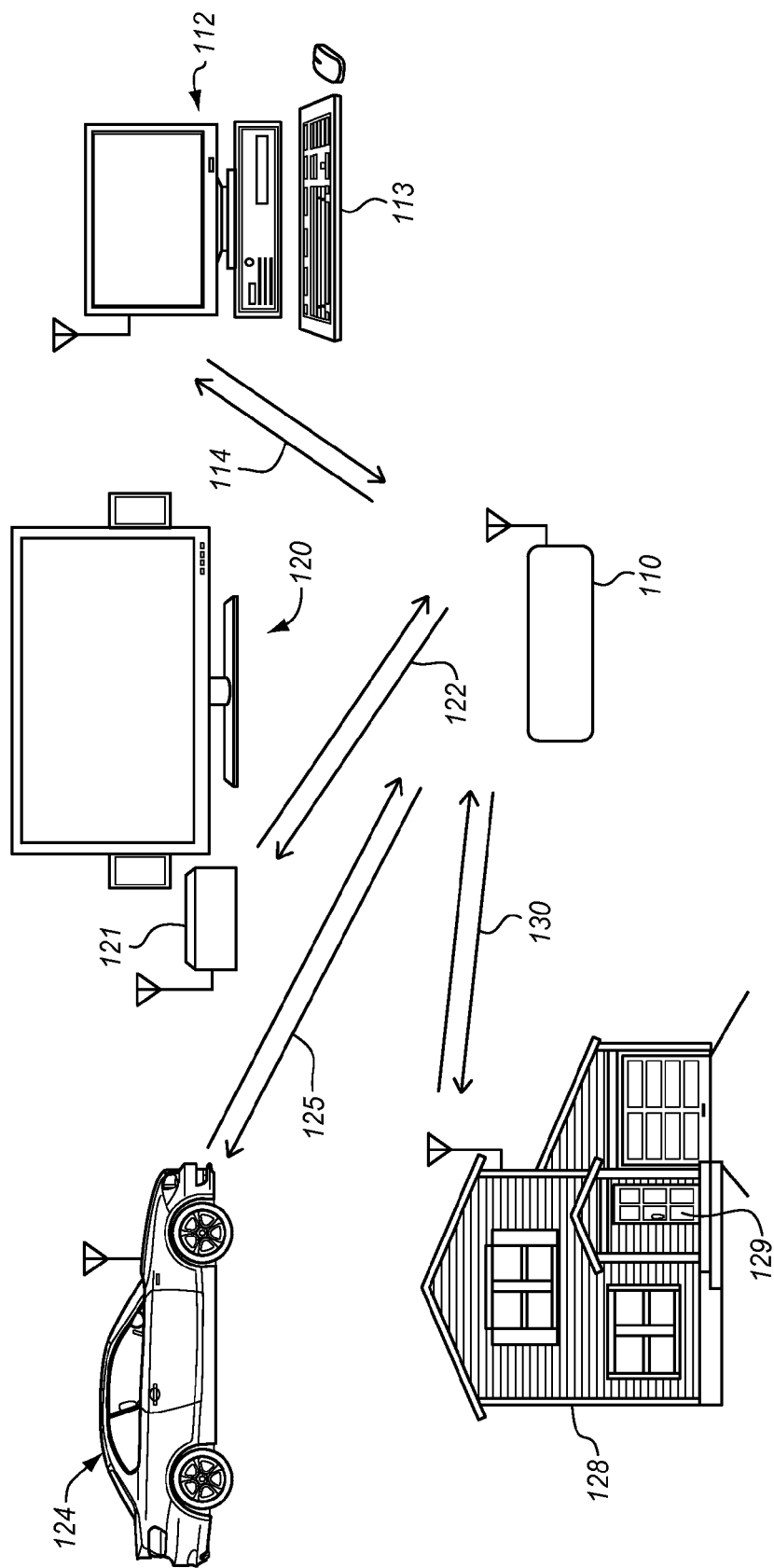
FIG. 3 is a diagram of communication between the computing unit and a variety of different devices according to an embodiment of the present invention.

In FIG. 3 the ECU 110 communicates not only with a computer 112 through a radio interface 114 but also with an entertainment system 120, a personal vehicle 124, and a complete home automation system 128. The radio interface with the computer allows all of the functions including configuration and authentication as described in the example of FIG. 2. Similar settings configurations and preferences can be relayed through a radio interface 122 with an entertainment set top box 121, audio video receiver, or similar device, or directly with a smart television. When approaching the entertainment system 120 or simply a single smart television, the user may be prompted to confirm authentication and then the user's personal settings and configuration may be restored based on information retrieved from the ECU. This may include not only favorite channels lists and preferred programming but it may also allow a user to pick up watching a particular program at the same time point at which the program was left off.

In addition, to the extent that the television supports access to internet sites, and other social network services, these may also be transferred to the set top box 121 to support the user's account settings and to allow the user to check status on any of a number of different business or social networks. Communicating 125 with the personal vehicle 124 such as a car or truck may transfer the user's preferred settings for operating the vehicle including seat settings, mirror settings, radio and ventilation settings. The transferred data may also include preferred destinations which have been entered for example through the entertainment system or the computer 113. The user's home address or business address may also be relayed to the vehicle to allow the navigation system to provide guidance.

The ECU may also be used as a type of wireless access key in the example of the vehicle 124. The ECU 110 may provide authentication to the vehicle so that the vehicle may then unlock the doors and allow the engine to be started. Similarly in the smart home 128 the ECU may transmit information 130 to the front door of the house or to any particular room door in the house to allow access by the user in to the house 128. Through codes and authentication stored and performed by the ECU with locks and other devices on the house, the house may be personalized to match the user's preferences and to provide access through any specifically authorized locked door.

Figure 4:
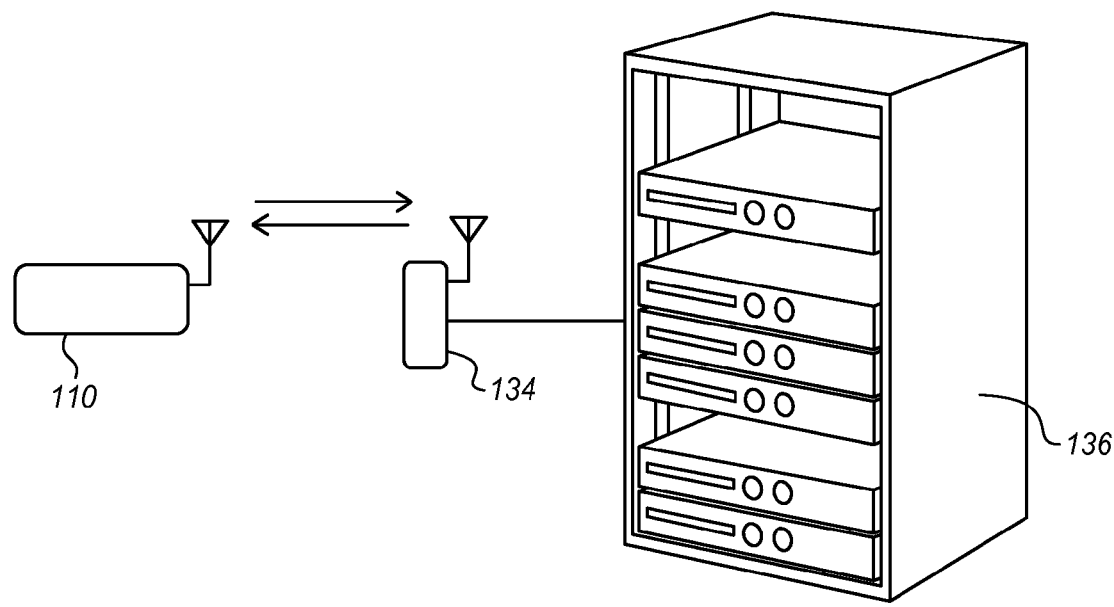
FIG. 4 is a diagram of communication between the computing unit and a server through a close range transponder according to an embodiment of the invention.

In the example of FIG. 4 the ECU 110 is communicating with a near field communication 134 WiFi, Bluetooth or other low power short range communication device. The NFC device is coupled directly to a server system. A user's data files, authentication, identification, and other preferences may be relayed through the NFC system 134 to the servers 136. These servers may reside in a commercial establishment for retail shopping, in a hospital for retaining data records, or in any other location the connection between the NFC device 134 and the servers 136 may be wired or wireless.

Figure 5:
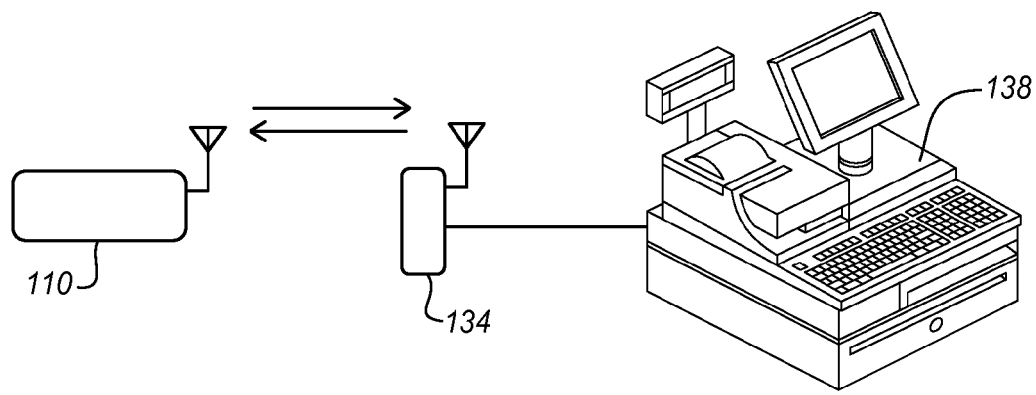
FIG. 5 is a diagram of communication between the computing unit and a point of sale terminal through a close range transponder according to an embodiment of the invention.

Similarly in FIG. 5 the ECU communicates through an NFC device 134 to a point of sale terminal 138 this can allow banking and financial transaction information to be passed from the ECU 110 into the point of sale terminal 138 to allow the user to make purchases. Instead of a point of sale terminal, the local terminal may be a banking terminal or a check in terminal at an airport, hotel, or hospital or any other local terminal. The local terminal may be coupled through a network to servers or other terminals so that it may complete the intended transaction and in order to access other user data that is stored remotely.

Figure 6:
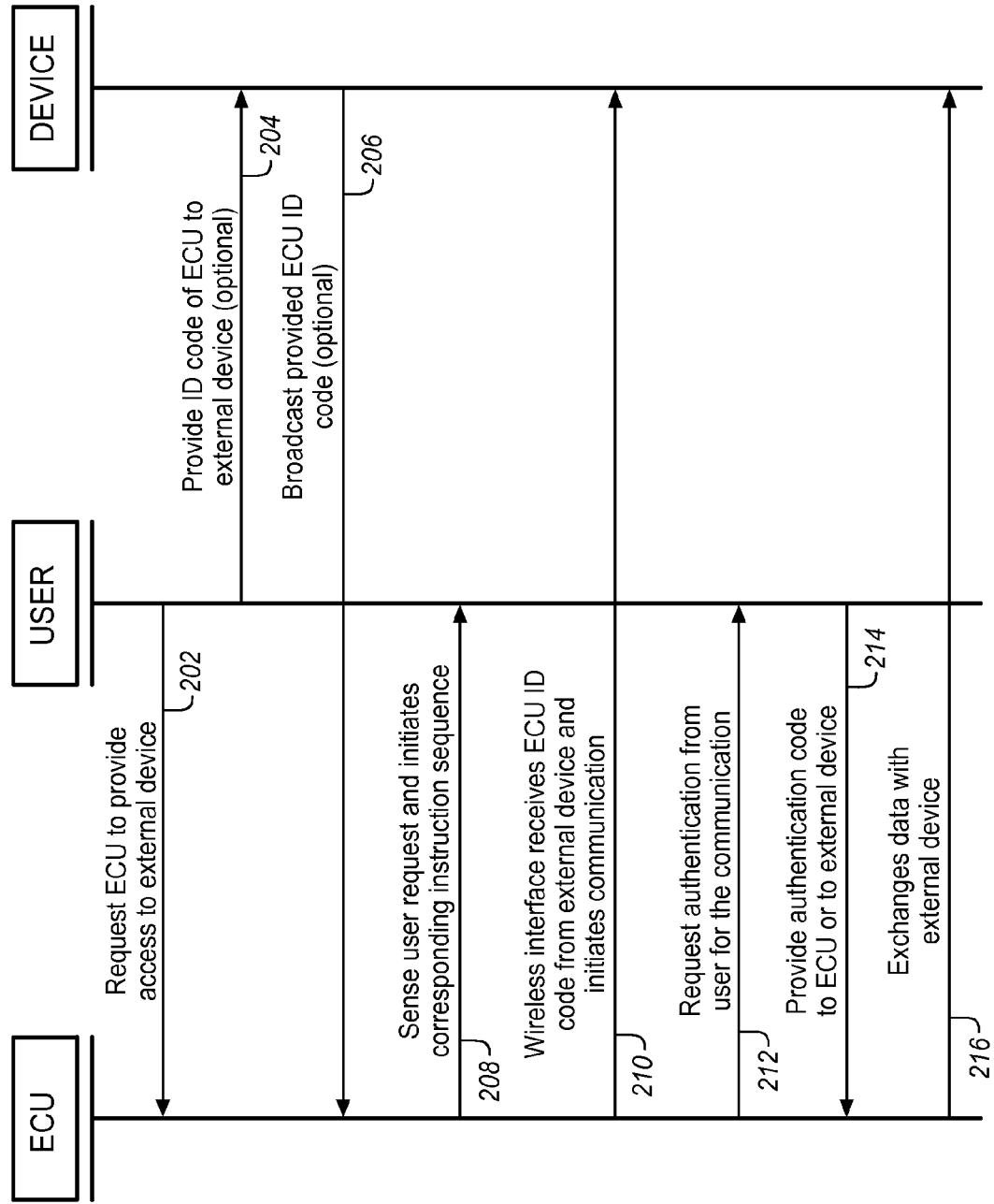
FIG. 6 is a communication signaling diagram of establishing authentication to an external device using the computing unit according to an embodiment of the invention.

FIG. 6 shows a process flow diagram of communicating between a user and an external device through an ECU as described above. At block 202 the user requests that the ECU provide access to the external device. The external device may be any of the devices shown in for example FIGS. 3, 4, and 5 or any other type of device. The user may make a request to the ECU using particular gestures or voice commands or tapping in order to stimulate the accelerometers of the ECU. At 204 the user provides an identification code for the ECU to the device this may be done for example by typing in a personalized name which has been given to the ECU into a keyboard of the external device. It may be done by any other type of human computer interaction mode including speech and gestures.

Once the name of the ECU has been provided to the external device at 206, the external device broadcasts this name provided by the user through its radio interface. At 208 the ECU has received the user request to provide access and it receives the broadcasted name and initiates a corresponding instruction sequence. At 210 the ECU, through its wireless interface, receives the user request through its external sensors pressure transducers, accelerometers, gyroscopes or other such sensors and accordingly initiates an instruction sequence to provide access to the external device. At 210 the ECU receives its name as it is broadcast by the external device through its wireless interface. Having received a broadcast of its name it then initiates communication with the external device.

At 212 the ECU has identified a broadcasted name and a mode of communication with the external device. The external device requests authentication and the ECU may then request that the user authorize the authentication with the external device. At 214 the user provides this authentication to the ECU or it may provide the authentication to the external device. The authentication may be provided through a gesture, a spoken command, or through any user input mode supported by the external device. This may include gestures, typing, speech, or commands input on a touch screen, touchpad or similar type touch service. After receiving an authorization from the user, at 216 the ECU authenticates the user to the external device and is able to exchange data. This data may be limited only to limited authorization or may also include a variety of other types of personal information as described above, such as identification information, password information, medical data, financial data, and more.

Figure 7:
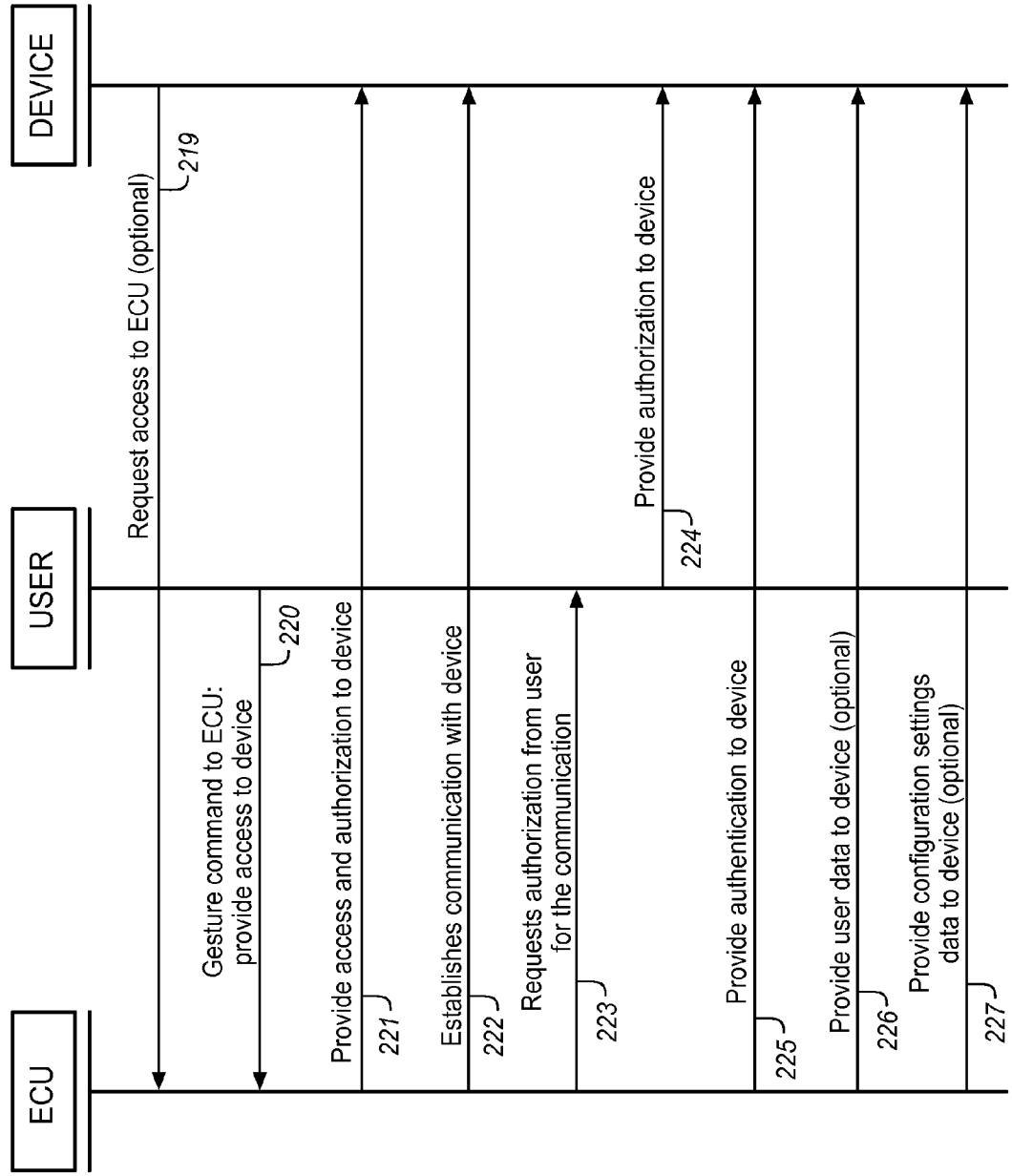
FIG. 7 is a communication signaling diagram of sending configuration setting from the computing unit and an external device according to an embodiment of the invention.

FIG. 7 is a process flow diagram of configuring an external device through an ECU. At 219 the external device requests access to the ECU. This operation is optional. The exchange of personal settings to follow this request may be initiated by the ECU or by the external device. At 220 the user provides a gesture command to the ECU to provide access to the external device for the user. At 221 the ECU provides access to the device and authorization. At 222 the ECU then establishes communication with the device and may at 223 request the user to authorize this communication.

If the user authorizes the device at 224 to communicate with the external device then the ECU can provide authentication to the device. This allows communication between the ECU and the device within parameters that may be set by the user. By interacting with the device or by pre-configuring the ECU for a particular use scenario at 226 the ECU may provide a variety of different types of views or data to the external device. Any of the types of data mentioned above may be conveyed to the external device. At 227 the ECU may also optionally provide configuration settings data to the device such as passwords and other user settings.

Figure 8:
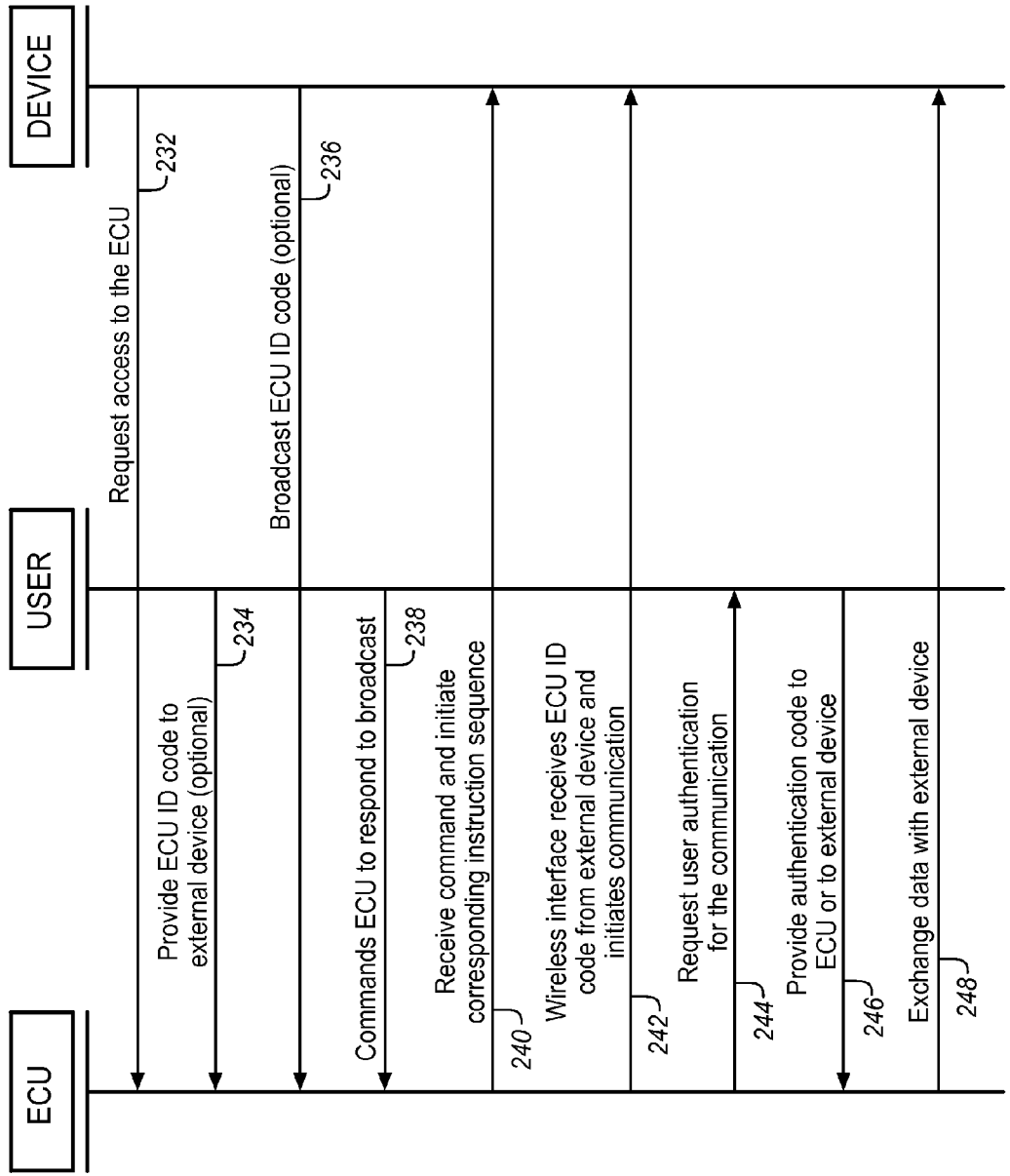
FIG. 8 is a communication signaling diagram of establishing communication between the computing unit and an external device according to an embodiment of the invention.

FIG. 8 is a further process flow diagram of providing a natural interaction with a computing element external to the ECU and the user. At 232 the external device may request access to the ECU. Optionally the user may command the ECU to request access to the external devise at 234. The user, in response to one request or another, provides an identification code to the external device by which the external device may identify the ECU. At 236 the external device then broadcasts this ID code within range of the ECU. At 238 the user commands the ECU to respond to this broadcasted ID code. At 240 the ECU receives this command and initiates a corresponding instruction sequence with the external device that allows the ECU and the external device to communicate with each other.

At 242 the ECU, through its wireless interface, receives the ID code from the external device and begins this communication as commanded by the user. At 244 the ECU requests that the user authenticate communications between the external device and the ECU. At 246 if the user provides authentication, using a code or a gesture, or a spoken command, either through the ECU or to some input on the external device, then at 248 the ECU exchanges its data with the external device. This process may be used for registering at a hospital or other service area for performing commercial transactions or for any other of a variety of purposes.

The techniques and equipment described herein may also be used to provide low priority access signals at all times throughout a vehicle, office or dwelling. This may be done whenever an ECU enabled computing element, such as a personal computer, mobile computer, vehicle, or home is available for communication. In many cases the security of communicating financial data, such as credit and debit information can be improved by using very short range communications. Near field communication and RFID may be used to authenticate purchases by the person to restrict the chance of eavesdropping.

As described above, the ECU may be controlled by voice, gestural, near field communication, or electromagnetic signals through its various sensor and radios. This allows the ECU to be commanded as described above. It also allows the user to program the ECU. As an example, the ECU may have several different public keys or different ID codes stored in memory. The ECU can be configured to the user to switch public keys among the available keys using hand gestures. The ECU may be programmable by the user in a remote secure location to avoid being observed.

Figure 9:
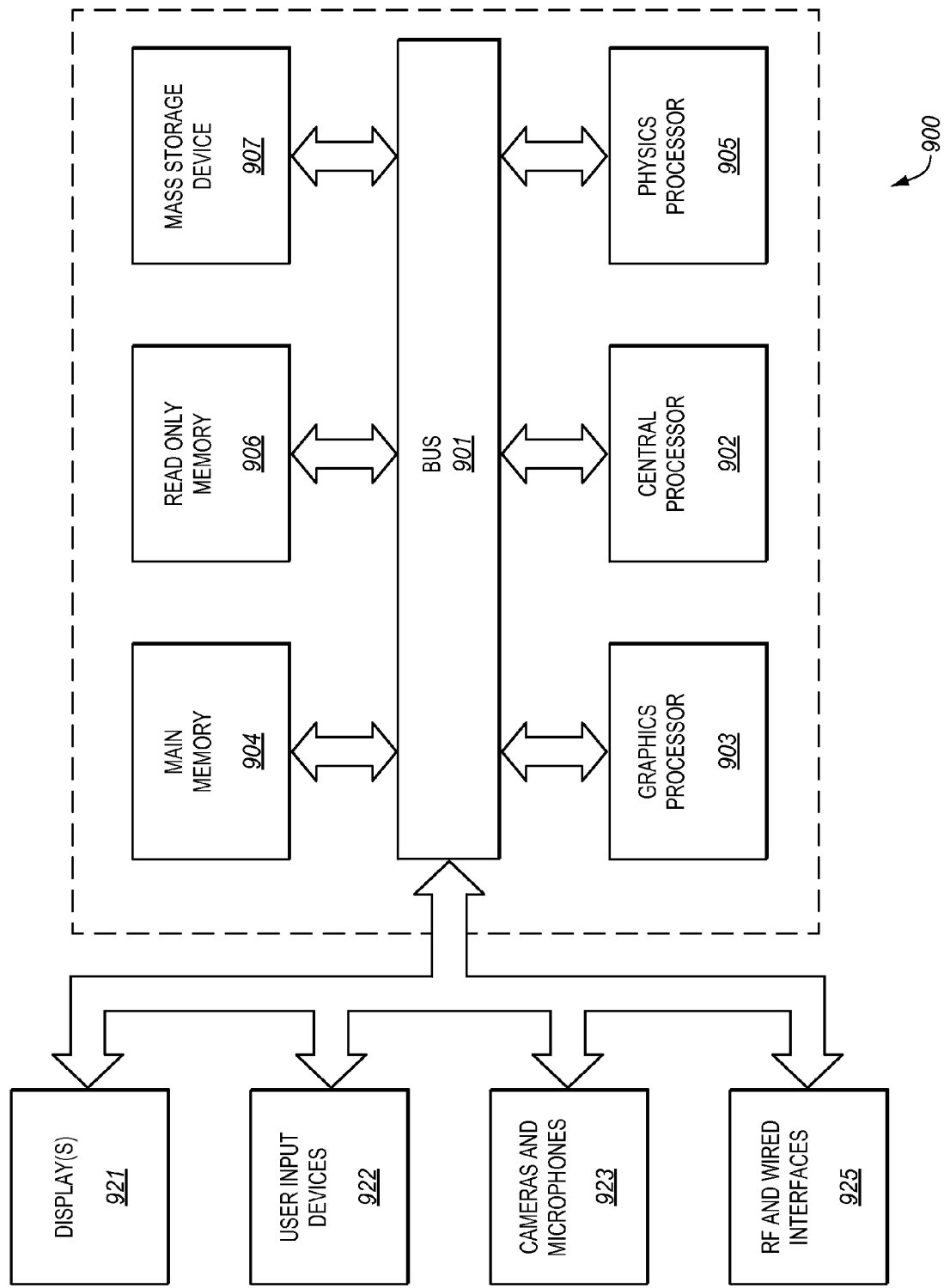
FIG. 9 is a block diagram of a computer system suitable for implementing processes of the present disclosure according to an embodiment of the invention

FIG. 9 is a block diagram of a computing system, such as a personal computer, gaming console, smartphone, kiosk, point of sale terminal, or business data terminal. Such a device may be used as the external device in the scenarios above or to program the ECU with particular code, use models, personal data, and encryption keys. The computer system 900 includes a bus or other communication means 901 for communicating information, and a processing means such as a microprocessor 902 coupled with the bus 901 for processing information. The computer system may be augmented with a graphics processor 903 specifically for rendering graphics through parallel pipelines and a physics processor 905 for calculating physics interactions as described above. These processors may be incorporated into the central processor 902 or provided as one or more separate processors.

The computer system 900 further includes a main memory 904, such as a random access memory (RAM) or other dynamic data storage device, coupled to the bus 901 for storing information and instructions to be executed by the processor 902. The main memory also may be used for storing temporary variables or other intermediate information during execution of instructions by the processor. The computer system may also include a nonvolatile memory 906, such as a read only memory (ROM) or other static data storage device coupled to the bus for storing static information and instructions for the processor.

A mass memory 907 such as a magnetic disk, optical disc, or solid state array and its corresponding drive may also be coupled to the bus of the computer system for storing information and instructions. The computer system can also be coupled via the bus to a display device or monitor 921, such as a Liquid Crystal Display (LCD) or Organic Light Emitting Diode (OLED) array, for displaying information to a user. For example, graphical and textual indications of installation status, operations status and other information may be presented to the user on the display device, in addition to the various views and user interactions discussed above.

Typically, user input devices, such as a keyboard with alphanumeric, function and other keys may be coupled to the bus for communicating information and command selections to the processor. Additional user input devices may include a cursor control input device such as a mouse, a trackball, a trackpad, or cursor direction keys can be coupled to the bus for communicating direction information and command selections to the processor and to control cursor movement on the display 921.

Camera and microphone arrays 923 are coupled to the bus to observe gestures, record audio and video and to receive visual and audio commands as mentioned above.

Communications interfaces 925 are also coupled to the bus 901. The communication interfaces may include a modem, a network interface card, or other well known interface devices, such as those used for coupling to Ethernet, token ring, or other types of physical wired or wireless attachments for purposes of providing a communication link to support a local or wide area network (LAN or WAN), for example. In this manner, the computer system may also be coupled to a number of peripheral devices, other clients, control surfaces or consoles, or servers via a conventional network infrastructure, including an Intranet or the Internet, for example.

A lesser or more equipped system than the example described above may be preferred for certain implementations. Therefore, the configuration of the exemplary system 10 and 900 will vary from implementation to implementation depending upon numerous factors, such as price constraints, performance requirements, technological improvements, or other circumstances.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection). Accordingly, as used herein, a machine-readable medium may, but is not required to, comprise such a carrier wave.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The following examples pertain to further embodiments. Specifics in the examples may be used anywhere in one or more embodiments. In one embodiment, an apparatus comprises an application processor, a memory to store data, a receive and a transmit array coupled to the application processor to receive data to store in the memory and to transmit data stored in the memory through a wireless interface, and an inertial sensor to receive user commands to authorize the processor to receive and transmit data through the receive and transmit array.

Further embodiments may also include one or more of an authentication unit having a hard coded password to further control access to data in the memory, an authentication unit to provide software controlled access codes for access to the data in the memory, a navigation sensor to determine a location of the apparatus and to control access to the data in the memory based on the determined location, a near field communication module to establish authentication with an external device within a near field, and a battery to power the apparatus and a wireless energy charging unit to provide external energy to the battery.

In further embodiments the apparatus is formed as a multi-chip module integrated on a flexible bio-compatible substrate. Further embodiment may also include a housing to hermetically encase the processor, memory receive and transmit array and inertial sensor in a long term implantable bio-polymer. The bio-polymer comprising at least one of polycarbonate-based thermoplastic polyurethanes and biocompatible metals such as Titanium. The polyurethanes may comprise at least one of multiple polymers including methylene di-p-phenyl-diisocyanate (MDI), hexamethylene diisocyanate (HDI), polycaprolactone diol (PCL-diol) and N,N-bis(2-hydroxyethyl)-2-aminoethane-sulfonic acid.

In further embodiments the receive and transmit array further comprise radiative elements embedded into the bio-polymer housing, the radiative elements being formed of a bio-compatible metal. Further embodiments are formed as a multi-chip module integrated on a flexible bio-compatible substrate wherein the receive and transmit array further comprises radiative elements formed in a backside of the multi-chip module.

Further embodiments may be implanted in a human body, the application processor interpreting movement of the body through the inertial sensor as commands and sending messages using the inertial sensor as a mechanical transducer to the human body. Further embodiments may be implanted in a human body, further comprising bio-metric sensors, such as blood pressure, blood sugar, arrhythmia, ECG, hormone and cholesterol sensors.

In another embodiment, a method comprises receiving a request from a user through an inertial sensor of a computing unit to provide access to the computing unit to an external device, receiving an identification code of the computing unit at the computing unit wirelessly from the external device, requesting user authorization for communication with the external device, receiving user authorization for the communication, and establishing wireless communication at the computing unit with the external device.

Further embodiments include the above method wherein the user authorization is received through the inertial sensor of the computing unit, wherein the user authorization is received through acoustic sensors of the computing unit, further comprising broadcasting a connection request to the external device before receiving the identification code from the external device, and wherein requesting user authorization comprises generating mechanical pulses through a housing of the computing unit using an accelerometer.

In another embodiment, a method comprises receiving a request from a user through an inertial sensor of a computing unit to provide access to the computing unit to an external device, receiving an identification code of the computing unit at the external device from the user, receiving the identification code of the computing unit at the computing unit wirelessly from the external device, requesting user authorization for communication with the external device, receiving user authorization for the communication at the external device, receiving the requested user authorization at the computing unit from the external device, and establishing wireless communication at the computing unit with the external device.

Further embodiments include the above method further comprising the computing unit authenticating the user to use the external device, further comprising sending personal setting for the external device to the external device from the user, and wherein the personal settings comprise at least one of commonly used programs, calendar, access to networking computing resources, positions of mirrors, seat conditions, heating conditions, and a destination of the user.

What is claimed is:

1. An apparatus comprising:
an application processor;
a memory to store data;
a receive and a transmit array coupled to the application processor to receive data to store in the memory and to transmit data stored in the memory through a wireless interface; and
an inertial sensor coupled to the processor to receive user commands to authorize the processor to receive and transmit data through the receive and transmit array, the user commands being received by the inertial sensor as different movements of the apparatus caused by sequences of body movements in which the apparatus is attached to the part of the body that is moving; and
an actuator coupled to the processor to communicate a felt reply to the user from the apparatus in response to receiving the user command.

2. The apparatus of claim 1, further comprising an authentication unit having a hard coded password to further control access to data in the memory.

3. The apparatus of claim 1, further comprising a navigation sensor to determine a location of the apparatus and to control access to the data in the memory based on the determined location.

4. The apparatus of claim 1, further comprising a housing to hermetically encase the processor, memory receive and transmit array and inertial sensor in a long term implantable bio-polymer comprising at least one of polycarbonate-based thermoplastic polyurethanes and bio-compatible metals.

5. The apparatus of claim 4, wherein the receive and transmit array further comprises radiative elements embedded into the bio-polymer housing, the radiative elements being formed of a bio-compatible metal.

6. The apparatus of claim 4, formed as a multi-chip module integrated on a flexible bio-compatible substrate wherein the receive and transmit array further comprises radiative elements formed in a backside of the multi-chip module.

7. The apparatus of claim 1, implanted in a human body, the application processor sending messages to the user as a continuation of a received command using the inertial sensor as a mechanical transducer to the human body.

8. The apparatus of claim 1, wherein the different sequences of body movements comprise particular sequences of leg movements.

9. A method comprising:
receiving a request from a user as a first sequence of user body movements through an inertial sensor of a computing unit to provide access to the computing unit to an external device;
acknowledging the request from the user through an actuator of the computing unit, the actuator delivering a mechanical pulse to the user through a housing of the computing unit as the acknowledgment;
receiving an identification code of the computing unit at the computing unit wirelessly from the external device;
requesting user authorization for communication with the external device after receiving the request to provide access;
receiving user authorization for the communication as a second sequence of user body movements after requesting user authorization, wherein the second sequence of body movements is different than the first sequence of body movements; and
establishing wireless communication at the computing unit with the external device.

10. The method of claim 9, wherein requesting user authorization comprises generating mechanical pulses through a housing of the computing unit using an accelerometer as the actuator.

11. The method of claim 9, wherein the actuator comprises a solenoid to provide a mechanical pulse to the user.

12. The method of claim 9, wherein the first sequence of body movements is a particular wave of a user hand.

13. The method of claim 9, wherein the first sequence of body movements is a writing gesture.

14. The method of claim 9, further comprising receiving a request from the user as a third sequence of body movements to enable the computing unit before receiving the request to provide access.

15. The method of claim 9, wherein acknowledging the request comprises the actuator delivering a series of mechanical pulses generated using an on-board accelerometer.

16. A method comprising:
   receiving a request from a user as a first sequence of user body movements through an inertial sensor of a computing unit to provide access to the computing unit to an external device, wherein the computing device is attached to the part of the body that is moving and the inertial sensor senses the body movements;
   acknowledging the request from the user through an actuator of the computing unit, the actuator delivering a mechanical pulse to the user as the acknowledgment;
   receiving an identification code of the computing unit at the external device from the user after receiving the request from the user at the computing unit;
   receiving the identification code of the computing unit at the computing unit wirelessly from the external device;
   requesting user authorization for communication with the external device after receiving the request to provide access;
   receiving user authorization as a second sequence of body movements sensed by the inertial sensor of the computing device, wherein the second sequence of body movements is different than the first sequence of body movements;
   receiving user authorization for the communication at the external device;
   receiving the requested user authorization at the computing unit from the external device; and
   establishing wireless communication at the computing unit with the external device.

17. The method of claim 16, further comprising the computing unit authenticating the user to use the external device and sending personal settings for the external device to the external device from the user.

18. The method of claim 17, wherein the personal settings comprise at least one of commonly used programs, calendar, access to networking computing resources, positions of mirrors, seat conditions, heating conditions, and a destination of the user.

* * * * *